(12) United States Patent
Zimmermann et al.

(10) Patent No.: US 6,779,514 B2
(45) Date of Patent: Aug. 24, 2004

(54) MANUALLY GUIDED IMPLEMENT

(75) Inventors: Helmut Zimmermann, Berglen (DE); Ralf Tuckermann, Stuttgart (DE)

(73) Assignee: Andreas Stihl AG & Co. (DE)

( * ) Notice: Subject to any disclaimer, the term of this patent is extended or adjusted under 35 U.S.C. 154(b) by 3 days.

(21) Appl. No.: 10/222,406

(22) Filed: Aug. 16, 2002

(65) Prior Publication Data

US 2003/0037773 A1 Feb. 27, 2003

(30) Foreign Application Priority Data

Aug. 21, 2001 (DE) .......................................... 101 40 905

(51) Int. Cl.$^7$ .............................................. F02M 31/00
(52) U.S. Cl. ...................................................... 123/556
(58) Field of Search ........................................ 123/556

(56) References Cited

U.S. PATENT DOCUMENTS

| | | | |
|---|---|---|---|
| 4,691,681 A | * | 9/1987 | Hoppner et al. ............ 123/556 |
| 4,765,282 A | | 8/1988 | Ngashima |
| 5,046,473 A | * | 9/1991 | Hokenson ................... 123/556 |
| 6,341,598 B1 | * | 1/2002 | Jessberger et al. .......... 123/556 |

FOREIGN PATENT DOCUMENTS

DE 3729814 3/1989

* cited by examiner

Primary Examiner—Marguerite McMahon
(74) Attorney, Agent, or Firm—R W Becker & Associates; R W Becker (57) ABSTRACT

A manually guided implement having an internal combustion engine and a carburetor for supplying a fuel/air mixture to the engine is provided. Disposed between the internal combustion engine and the carburetor is a housing wall in which is arranged a preheating window for guiding to the carburetor a preheating air stream that is heated-up by the internal combustion engine. A pivotably mounted switching element is provided for closing and opening the preheating window.

17 Claims, 6 Drawing Sheets

MANUALLY GUIDED IMPLEMENT

BACKGROUND OF THE INVENTION

The present invention relates to a manually guided implement having an internal combustion engine and a carburetor for supplying a fuel/air mixture to the internal combustion engine.

Manually guided implements, such as chain saws, brush cutters, trimmers, suction or blower devices, or the like, having an internal combustion engine are used outdoors under changing climatic conditions. Thus, a carburetor must provide an optimally adjusted fuel/air mixture for operation of the internal combustion engine in a wide temperature range as well as at different levels of humidity. At high atmospheric temperatures, it is desirable to draw in through the carburetor fresh air that is as cool as possible, since the cool air has a high density, and the internal combustion engine has a corresponding efficiency. However, if the temperature is close to freezing, carburetor icing can occur, whereby an ice layer forms in the region of a Venturi section or at the fuel nozzles in the carburetor. The ice layer adversely affects the formation of an optimum fuel/air ratio, and can lead to shut down of the internal combustion engine.

To avoid carburetor icing, a number of devices are known according to which intake air is guided past hot portions of the internal combustion engine and is drawn in through the carburetor. Due to the increased temperature, however, the intake air has a relatively low air density, which adversely affects the power of the internal combustion engine. A switching device for the selective supply of cool or warm intake air, as well as a corresponding guidance of air past hot parts of the engine and through an air filter and the carburetor, is structurally complicated and expensive.

It is therefore an object of the present invention to provide a manually guided implement having an easy to operate carburetor preheating.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The implement of the present invention is characterized primarily in that a housing wall is disposed between the internal combustion engine and the carburetor, in that a preheating window is disposed in the housing wall for guiding to the carburetor a preheating air stream that has been heated-up by the internal combustion engine, and in that a switching element is provided that is pivotably mounted on the housing wall and serves for opening and closing the preheating window.

Thus, pursuant to the present invention, it is proposed to dispose, in a housing wall between the internal combustion engine and the carburetor, a preheating window, whereby a pivotably mounted switching element is provided for closing and opening the preheated window. As a consequence of the preheating window, air heated up by the internal combustion engine can be conveyed to the carburetor, to avoid icing, without the need for a complicated guidance of a preheated air stream. In this connection, a partial stream can be branched off, in particular from a cooling air stream that is heated up by the internal combustion engine, and the partial stream can be guided through the preheated window.

A separate heat exchanger for heating-up the preheating air stream is not required. The pressure head produced by the cooling fan is sufficient for conveying the preheating air stream, so that a separate conveying device can also be eliminated. As a result of the pivotably mounted switching element, the preheating air stream can be adjusted in a straightforward manner, or if necessary it can also be completely shut off, as a function of the climatic atmospheric conditions. The pivotable mounting of the switching element can be produced in a straightforward and economical manner. For the actuation, only slight frictional forces have to be overcome, so that the switching element can also be adjusted in a sensitive manner into intermediate positions. In this connection, the switching element is expediently disposed on that side of the housing wall that faces away from the internal combustion engine, as a result of which the switching element is disposed beyond the cooling air stream, as a result of which the cooling air stream, or its cooling capacity, is not adversely affected. Mounting of the switching element on the housing wall in the region of the preheating window provides a precisely defined alignment of the switching element relative to the preheating window, so that even when deformations occur, for example caused by temperature or vibrations, a precisely defined opening or closing of the preheating window is provided.

Pursuant to one advantageous further development, the switching element is disposed between the housing wall and a base of an air filter for the carburetor. As a result, the switching element can be bilaterally mounted not only on the housing wall but also on the air filter base, as a result of which the precision of the guidance of the switching element is improved. A further opening can also be provided in the air filter base, as a result of which a single switching element can be provided to open or close this opening together with the preheating window. In this connection, the preheating air stream can also pass through the air filter base to the air filter and from there into the carburetor.

Pursuant to one expedient further development, the preheating air stream can be conveyed between the housing wall and the air filter base to outer surfaces of the carburetor. In this connection, the housing wall and the air filter base form a flow channel in which, without further guide means, the preheating air stream is guided and the outside of the carburetor is warmed up. By warming up the outer side of the carburetor, an inner icing in the region of the intake channel is avoided. Cool intake air is drawn in through the intake channel of the carburetor, as a result of which, due to the high air density, a high output of the internal combustion engine can be achieved.

Pursuant to one advantageous further development, the switching element has an actuating recess in the form of a finger recess or a tool recess. Thus, an operator can introduce a finger into the finger recess and can pivotably actuate the switching element. During engagement into the finger recess, various control positions, especially in conjunction with an arresting, can be reliably detected, thereby avoiding erroneous adjustments. Alternatively, or in addition thereto, it can be expedient to form a tool recess into which can be inserted a tool, for example a screwdriver. As a result, the switching element is also easy to operate where space is limited.

The internal combustion engine is fixed in position on a main implement body in a vibration-damping manner, whereby a vibration gap is formed between a housing portion on the motor side and a housing portion on the side of the main body. The switching element is, in this connection, disposed in the region of the vibration gap in such a way that the switching element can be operated through the vibration gap, for example with a screwdriver. As a result, no further openings are required in the housing or in corresponding cover portions for actuating the switching element. The region of the carburetor or of the preheating air stream can be appropriately completely covered, thereby avoiding contamination or fouling from, for example, sawdust, dust or the like.

To achieve clearly defined switching positions, in which either no preheating air stream, a maximum preheating air stream, or for example a precisely predefined partial stream is supplied to the carburetor, the switching element is expediently to be actuated in an arresting manner in at least two positions. Due to the arresting action, an unintentional shifting of the switching element can also be avoided.

Pursuant to one advantageous embodiment, the switching element is made of an elastic material, especially as a monolithic component. In this connection, straightforward detents or arresting edges can be provided on a housing wall or on the base of the air filter, without thereby having to form structurally complicated spring tongues or the like. The elastic deformation required for an arresting action is provided by the elastic material of the switching element. At the same time, measurement tolerances as well as deformations caused in the region of the housing wall and of the air filter base by temperature or vibration can be compensated for. A jamming or binding of the switching element is reliably prevented. In connection with a finger recess for actuating the switching element, due to the elastic material a reliable detection of the various arresting positions is possible.

For a simple mounting and a reliable pivotability, the switching element is provided with a shaft journal that can be snapped into a mounting opening provided in particular on the housing wall. In conjunction with forming the switching element from an elastic material, the switching element can easily be retained in the mounting opening. In this connection, the shaft journal is expediently hollow, and in the mounting state has passing therethrough a securing pin on the air filter base. In this connection, the securing pin reliably prevents an unintentional loosening of the snap connection, and furthermore serves as an additional, reinforcing mounting, as a result of which, despite the elastic switching element material, a precise guidance of the switching element is provided.

Further specific feature of the present invention will be described in detail subsequently.

DESCRIPTION OF PREFERRED EMBODIMENTS

Figure 1:
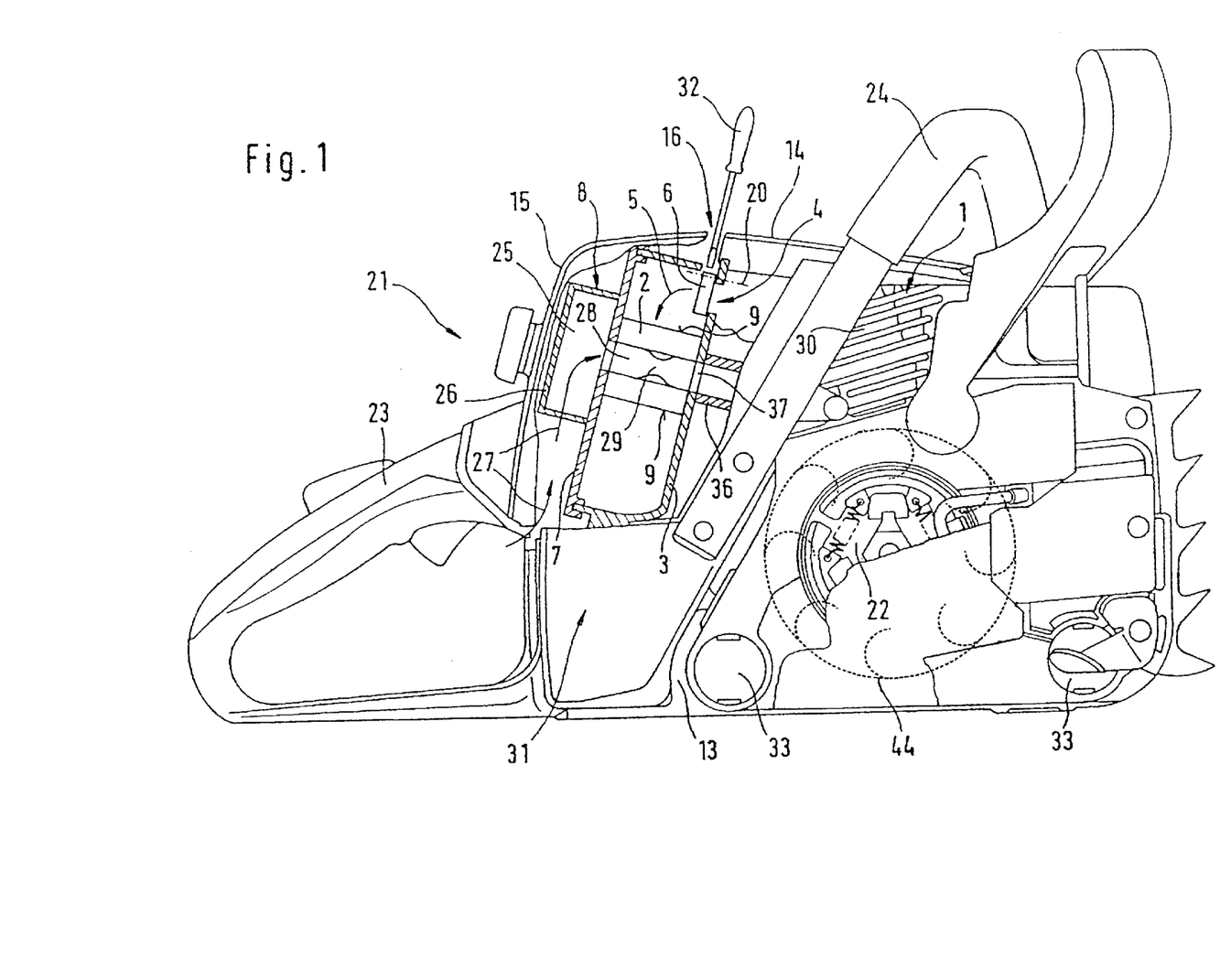
FIG. 1 is a side view of one exemplary embodiment of an inventive implement, here by way of example as a chain saw, having a schematically illustrated arrangement for preheating the carburetor.

Referring now to the drawings in detail, FIG. 1, in a side view, shows an implement, which in the illustrated embodiment is a chain saw 21 which, to facilitate illustration, is shown without a guide bar and a cutting chain. The chain saw 21 has a main implement body 13 with which is monolithically formed a rear handle 23. In addition, a front handle 24, for guiding the chain saw 21, is fixed in position on the main implement body 13. An internal combustion engine 1 is mounted on the main implement body 13 via anti-vibration elements 33. Provided on the internal combustion engine 1 is a coupling or clutch 22 on which is held a non-illustrated driving pinion for the saw chain. On that side of the internal combustion engine 1 opposite the clutch 22 there is provided a cooling air fan 44 that is driven by the internal combustion engine 1 and is provided for cooling the engine, especially in the region of its cylinder 30.

On that side of a housing wall 3 that faces away from the internal combustion engine 1, which housing wall is monolithically formed with the main implement body 13, there is disposed a carburetor 2 (FIGS. 1 and 4) for supplying the internal combustion engine 1 with a fuel/air mixture. An intake channel 28 having a Venturi section 29 extends through the carburetor 2. Via an intake window 37 in the housing wall 3, as well as an intake conduit 36, the intake channel 28 is connected with the cylinder 30. To compensate for the vibration movement of the internal combustion engine 1 relative to the main implement body 13, the intake conduit 36 has an elastic design. Disposed against that side of the carburetor 2 that is opposite from the housing wall 3 is a base 7 of an air filter 8. The air filter 8 includes a filter element 25, which is held between an air filter housing 26 and the base 7 of the air filter. In the illustrated arrangement, an intake air stream, which is illustrated by the arrows 27, is drawn in through the air filter 8 by the internal combustion engine 1 via the intake conduit 36 and the intake window 37.

The chain saw 21 has a housing 31, the housing components of which include a cover portion 14 on the motor side, and an air filter cover portion 15 on the side of the main body. A vibration gap 16 is formed between the two housing portions 14 and 15. The housing portion 14 on the motor side surrounds the internal combustion engine 1 in the region of its cylinder 30 and, together with the housing wall 3, guides a cooling air stream that is produced by the cooling fan and that is heated up at the cylinder 30. Provided in the housing wall 3 is a preheating window 4 which can be closed off or exposed by a switching or shifting element 6, which is mounted so as to be pivotable about a pivot axis 20. The pivot axis 20 is disposed approximately perpendicular to the housing wall 3, as a result of which the switching element 6 can be pivoted approximately parallel to the housing wall 3. In the exposed state of the preheating window 4, a partial stream of the heated-up cooling air stream is branched off and is conveyed to the carburetor 2 as a preheating air stream, which is indicated by the arrow 5. The preheating air stream 5 can be guided through the air filter 8, and in the illustrated embodiment is guided between the housing wall 3 and the base 7 of the air filter to outer surfaces 9 of the carburetor. The switching element 6 is disposed in the region of the vibration gap 16 in such a way that it can be actuated, for example, by means of a screwdriver 32 or some other tool that is inserted through the vibration gap 16.

Figure 2:
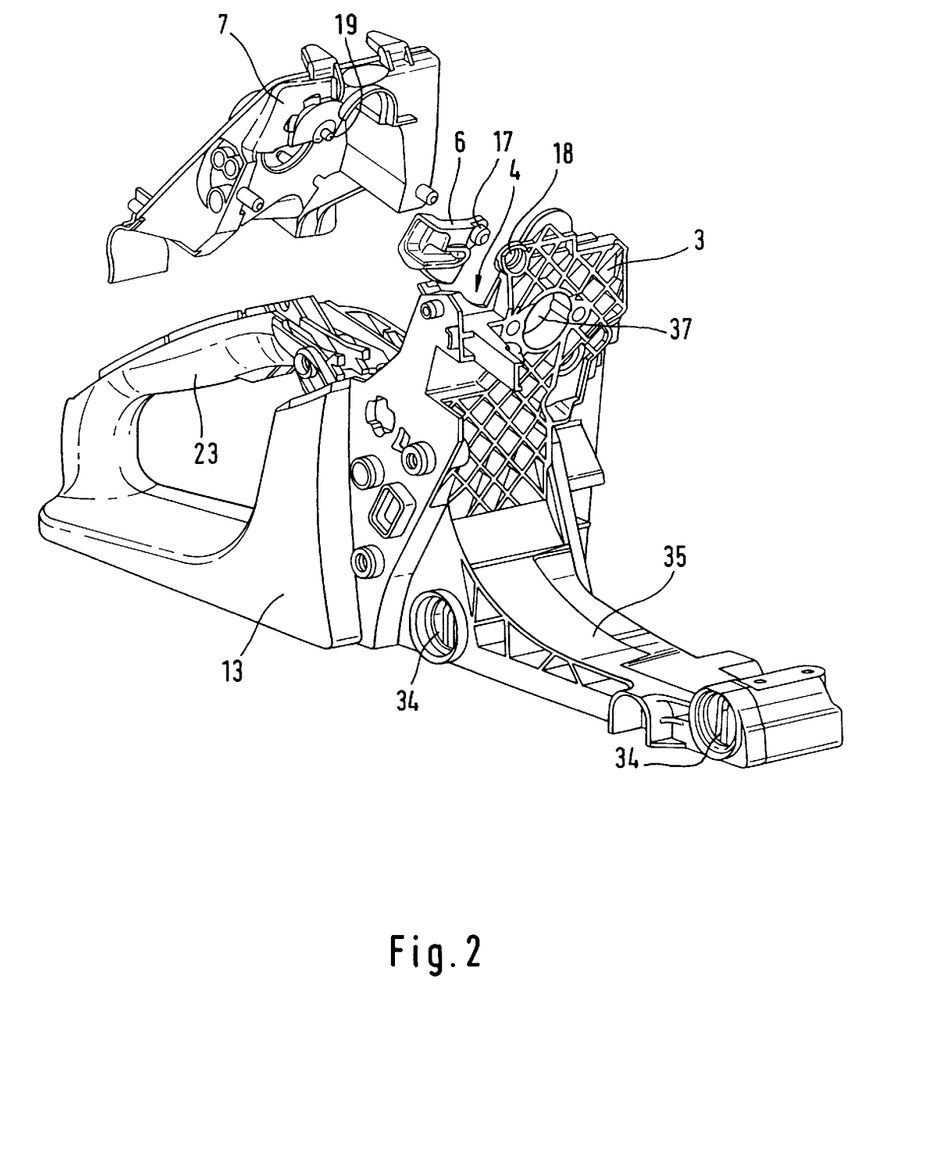
FIG. 2 is an exploded perspective view of the main implement body, the switching element, and the air filter base of the chain saw of FIG. 1.

The exploded, perspective view of FIG. 2 shows individual components of the arrangement of FIG. 1. Monolithically formed with the main implement body 13 are a portion of the rear handle 23, the housing wall 3, as well as a motor mount 35 having two receiving openings 34 for the anti-vibration elements 33 (FIG. 1). Disposed in the region of the intake window 37, in the housing wall 3, is the preheating window 4 in the shape of a segment of a circle.

The switching element 6 is provided with a shaft journal 17 that can be snapped into a mounting opening 18 in the vicinity of a preheating window 4. In the assembled state, the switching element 6 is thereby mounted on the housing wall 3. The shaft journal 17 is hollow, so that a securing pin 19 of the air filter base 7 can extend through the shaft journal 17.

Figure 3:
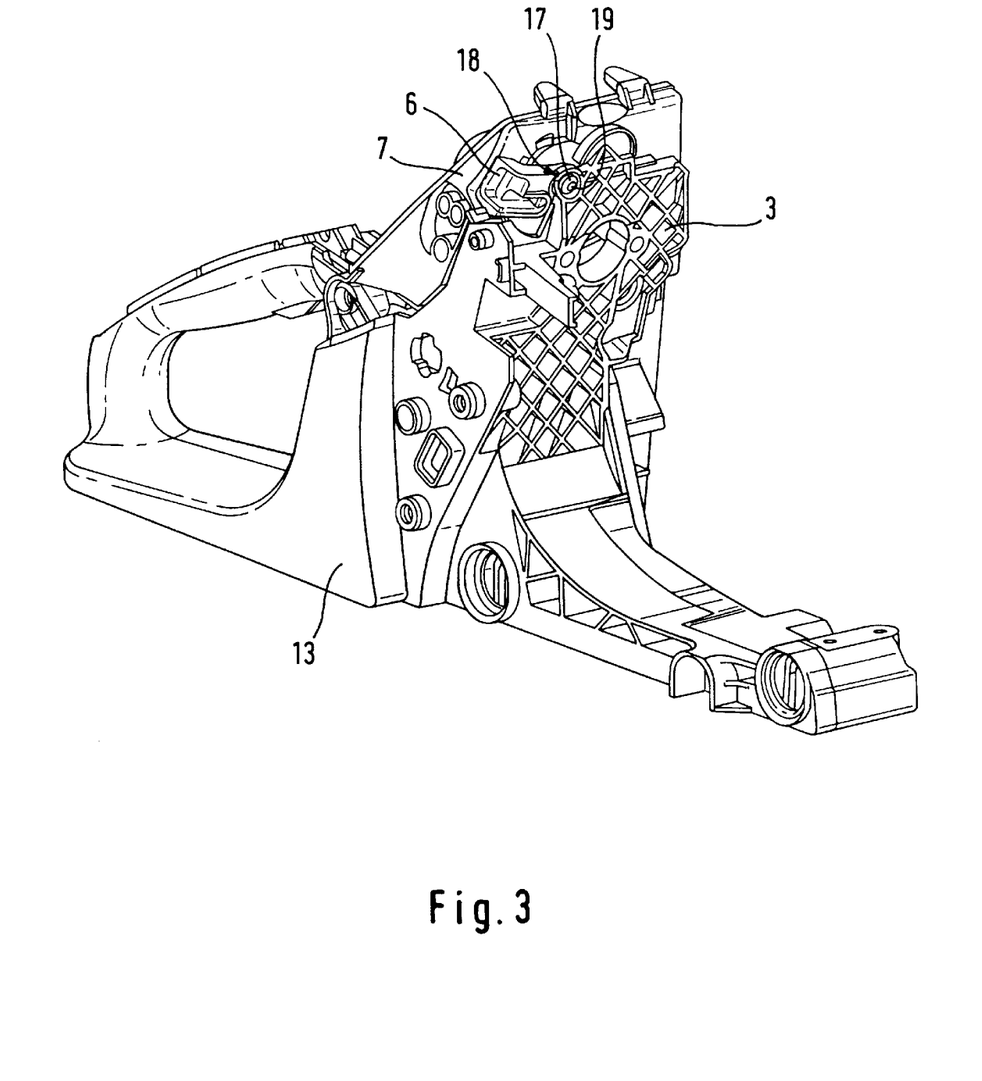
FIG. 3 is a perspective view of the arrangement of FIG. 2 in the assembled state.

FIG. 3 shows the arrangement of FIG. 2 in the assembled state. The switching element 6 is held between the housing wall 3 and the air filter base 7, whereby the securing pin 19 of the air filter base 7 extends through the hollow shaft journal 17 as well as the mounting opening 18.

Figure 4:
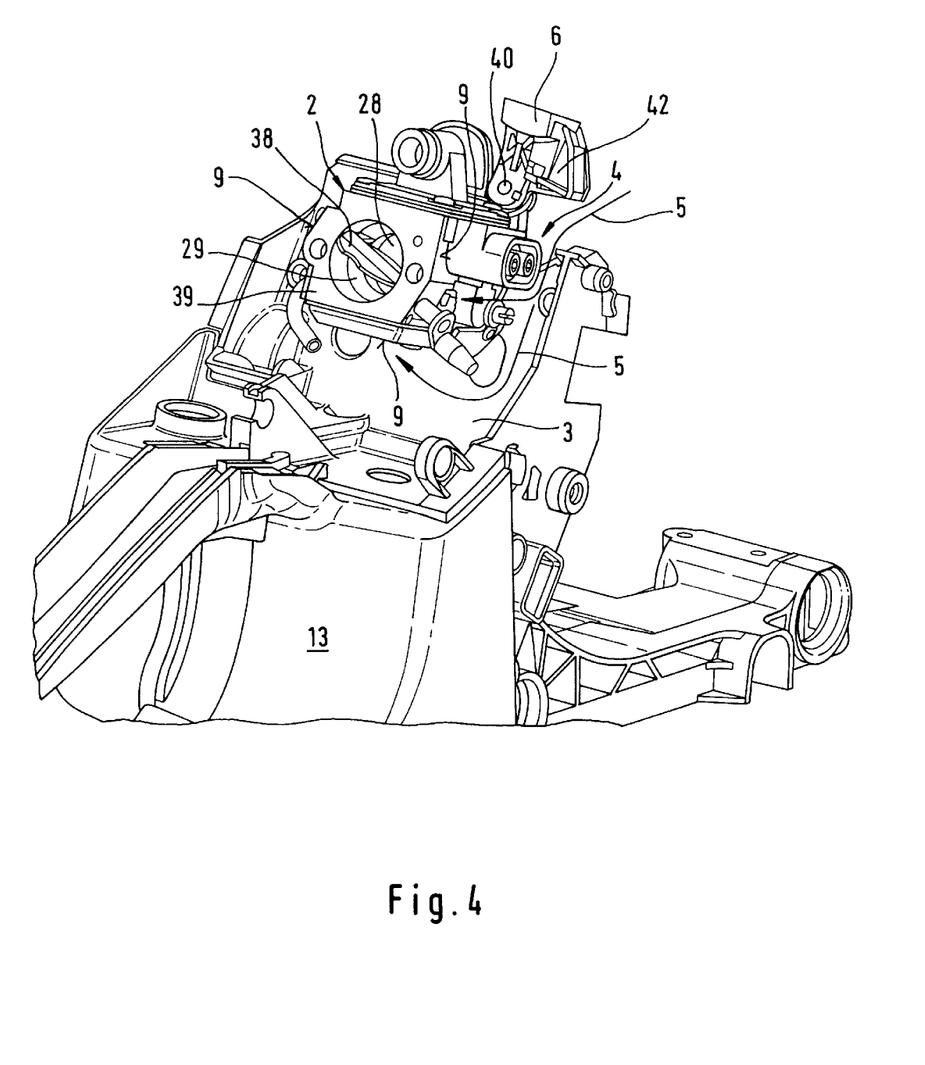
FIG. 4 is a further perspective view of the arrangement of FIG. 3 with a mounted carburetor and the base of the air filter removed.

FIG. 4 shows the arrangement of FIG. 3 from the back side, whereby the carburetor 2 is mounted on the housing wall 3, and the air filter base 7 (FIG. 3) is removed. The intake channel 28 opens out in an end face 39 of the carburetor 2, whereby in the direction of flow a butterfly valve 38 is disposed upstream of the Venturi section 29 for control of the engine power. In the installed state, the air filter base 7 (FIG. 3) rests flat against the end face 39. The shaft journal 17 (FIG. 2) of the switching element 6, by means of a continuous receiving opening 40 for receiving the securing pin 19 (FIG. 2), is hollow. As a consequence of the snap connection of the shaft journal 17 in the mounting opening 18 (FIG. 2), the switching element 6 of FIG. 4 is also pivotable without the air filter base 7 mounted. The switching element 6 is shown pivoted in a position in which a closure surface 42 of the switching element 6, which closure surface corresponds approximately to the contour of the preheating window 4, exposes the preheating window. As a consequence, as indicated by the arrows 5, a preheating air stream can be conducted through the preheating window 4 to outer surfaces 9 of the carburetor 2.

Figure 5:
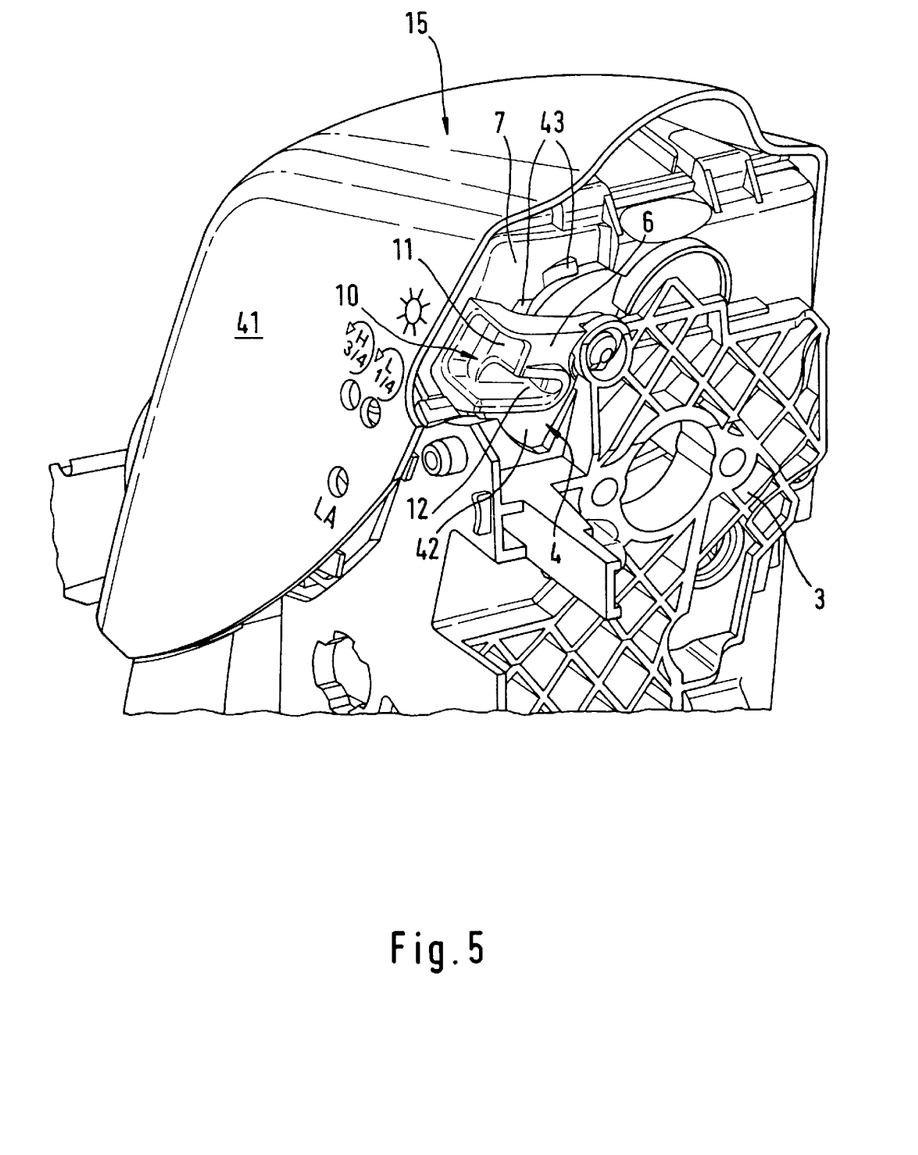
FIG. 5 shows an enlarged portion of the arrangement of FIG. 3 with the air filter cover mounted and the preheating window in a closed state.

The enlarged sectional view of FIG. 5 shows the arrangement of FIG. 3, with the housing portion 15 on the side of the main body being mounted in the form of an air filter cover 41. In the illustrated arrangement the preheating window 4 in the housing wall 3 is closed off by the closure surface 42 of the switching element 6. The switching element 6 is provided with actuating recesses 10 that in the illustrated embodiment include a finger recess 11 and a tool recess 12. A tool, for example in the form of a screwdriver 32 (FIG. 1), can be introduced into the tool recess 12 for actuating the switching element 6. The air filter cover 41 can be removed to permit actuation via a finger in the finger recess 11.

The switching element 6, together with its shaft journal 17 (FIG. 2), are produced as a single piece from an elastic polymeric material. Formed on the air filter base 7 are two detents 43 by means of which the switching element 6 can be shifted in an arresting manner into three positions. In the illustrated embodiment, the detents 43 are rigid, whereby the arresting action is effected via an elastic deformation of the switching element 6. The detents 43 could also be provided on the housing wall 3.

Figure 6:
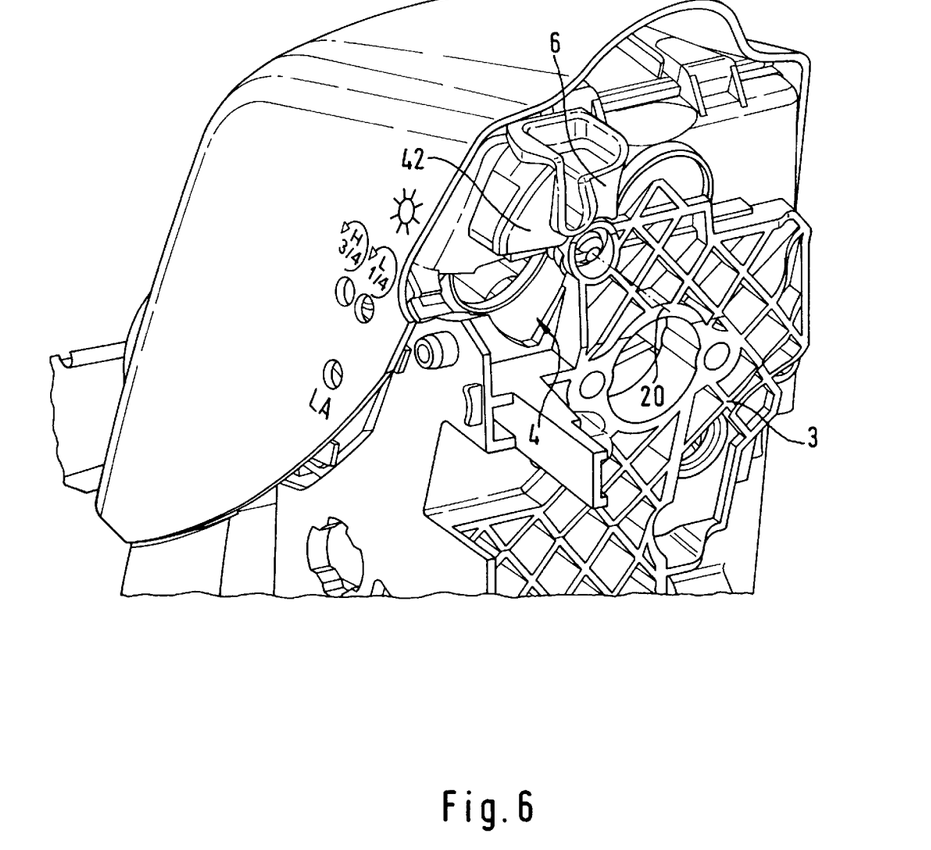
FIG. 6 shows the arrangement of FIG. 5 with the switching element in the position for opening the preheating window.

FIG. 6 shows the arrangement of FIG. 5, whereby in contrast to the position illustrated in FIG. 5, the switching element 6 is pivoted about the pivot axis 20 in such a way that the closure surface 42 completely releases or exposes the preheating window 4. Between the two positions of the switching element 6 shown in FIGS. 5 and 6, an additional intermediate position can be established in an arresting manner, whereby in this intermediate position the closure surface 42 partially covers the preheating window 4.

The specification incorporates by reference the disclosure of German priority document 101 40 905.2 filed Aug. 21, 2002.

The present invention is, of course, in no way restricted to the specific disclosure of the specification and drawings, but also encompasses any modifications within the scope of the appended claims.

We claim:

1. A manually guided implement having an internal combustion engine that is disposed in a housing and to which a cooling air stream is guided via a cooling air fan, said implement also having a carburetor for supplying a fuel/air mixture to said internal combustion engine, said implement further comprising:

a housing wall that is disposed between said internal combustion engine and said carburetor for guiding said cooling air stream;

a preheating window disposed in said housing wall, wherein a partial stream of said cooling air stream, which has been heated-up by said internal combustion engine, is guided through said preheating window to outer surfaces of said carburetor as a preheating air stream and is not utilized as an air intake stream to the carburetor; and a switching element that is pivotably mounted on said housing wall, wherein said switching element serves for an opening and closing of said preheating window.

2. An implement according to claim 1, wherein said witching element is disposed on a side of said housing wall that faces away from said internal combustion engine.

3. An implement according to claim 2, wherein said switching element is mounted on said housing wall in a region of said preheating window.

4. An implement according to claim 1, wherein an air filter having an air filter base is provided for said carburetor, wherein said switching element 6 is disposed between said housing wall and said air filter base.

5. An implement according to claim 4, wherein said preheating air stream is guidable between said housing wall and said air filter base to outer surfaces of said carburetor.

6. An implement according to claim 1, wherein said switching element is provided with at least one actuating recess.

7. An implement according to claim 6, wherein said at least one actuating recess is in the form of at least one of a finger recess and a tool recess.

8. An implement according to claim 1, wherein said internal combustion engine is fixed in position on a main implement body of said implement in a vibration-damping manner, wherein a first housing portion is provided on a motor side, wherein a second housing portion is provided on the side of the main body of said implement, wherein a vibration gap is formed between said first and second housing portions, and wherein said switching element is actuatable through said vibration gap.

9. An implement according to claim 1, wherein means are provided for fixing said switching element in at least two positions in an arresting manner.

10. An implement according to claim 9, wherein said means for arresting said switching element provide for arresting said switching element in end positions.

11. An implement according to claim 1, wherein said switching element is made of an elastic material.

12. An implement according to claim 11, wherein said switching element is a monolithic component.

13. An implement according to claim 4, wherein said switching element is provided with a shaft journal, wherein a mounting opening is provided, and wherein said shaft journal is adapted to be snapped into said mounting opening.

14. An implement according to claim 13, wherein said shaft journal is hollow, wherein a securing pin is provided on said air filter base, and wherein said securing pin is adapted to extend through said shaft journal.

15. A manually guided implement having an internal combustion engine that is disposed in a housing and to which a cooling air stream is guided via a cooling air fan, said implement also having a carburetor for supplying a fuel/air mixture to said internal combustion engine, said implement further comprising:
- a housing wall that is disposed between said internal combustion engine and said carburetor for guiding said cooling air stream;
- a preheating window disposed in said housing wall, wherein a partial stream of said cooling air stream, which has been heated-up by said internal combustion engine, is guided through said preheating window to outer surfaces of said carburetor as a preheating air stream; and
- a switching element that is pivotably mounted on said housing wall, wherein said switching element serves for an opening and closing of said preheating window, and wherein said switching element is provided with at least one actuating recess.

16. A manually guided implement having an internal combustion engine that is disposed in a housing and to which a cooling air stream is guided via a cooling air fan, said implement also having a carburetor for supplying a fuel/air mixture to said internal combustion engine, said implement further comprising:
- a housing wall that is disposed between said internal combustion engine and said carburetor for guiding said cooling air stream, wherein said internal combustion engine is fixed in position on a main implement body of said implement in a vibration-damping manner, wherein a first housing portion is provided on a motor side, wherein a second housing portion is provided on the side of the main body of said implement, wherein a vibration gap is formed between said first and second housing portions;
- a preheating window disposed in said housing wall, wherein a partial stream of said cooling air stream, which has been heated-up by said internal combustion engine, is guided through said preheating window to outer surfaces of said carburetor as a preheating air stream; and
- a switching element that is pivotably mounted on said housing wall, wherein said switching element serves for an opening and closing of said preheating window, and wherein said switching element is actuatable through said vibration gap.

17. A manually guided implement having an internal combustion engine that is disposed in a housing and to which a cooling air stream is guided via a cooling air fan, said implement also having a carburetor for supplying a fuel/air mixture to said internal combustion engine, said implement further comprising:
- a housing wall that is disposed between said internal combustion engine and said carburetor for guiding said cooling air stream;
- a preheating window disposed in said housing wall, wherein a partial stream of said cooling air stream, which has been heated-up by said internal combustion engine, is guided through said preheating window to outer surfaces of said carburetor as a preheating air stream; and
- a switching element that is made of an elastic material and is pivotably mounted on said housing wall, wherein said switching element serves for an opening and closing of said preheating window.

* * * * *